United States Patent [19]
Ernstoff et al.

[11] Patent Number: 5,668,611
[45] Date of Patent: Sep. 16, 1997

[54] FULL COLOR SEQUENTIAL IMAGE PROJECTION SYSTEM INCORPORATING PULSE RATE MODULATED ILLUMINATION

[75] Inventors: Michael N. Ernstoff; George C. Valley, both of Los Angeles; Steven E. Shields, San Diego, all of Calif.

[73] Assignee: Hughes Electronics, Los Angeles, Calif.

[21] Appl. No.: 449,586

[22] Filed: May 24, 1995

Related U.S. Application Data

[63] Continuation-in-part of Ser. No. 360,870, Dec. 21, 1994.

[51] Int. Cl.$^6$ ............................................. H04N 5/74
[52] U.S. Cl. ................... 348/771; 348/770; 345/84; 345/148
[58] Field of Search .................... 238/744, 756, 238/758, 759, 771, 776, 779, 781, 782, 760, 254, 815; 359/443, 245; 345/148, 147; H04N 5/74, 9/31

[56] References Cited

U.S. PATENT DOCUMENTS

| | | | |
|---|---|---|---|
| 4,680,579 | 7/1987 | Ott | 348/771 |
| 5,212,555 | 5/1993 | Stolz | 348/771 |
| 5,214,420 | 5/1993 | Thompson et al. | 340/795 |
| 5,428,408 | 6/1995 | Stanton | 348/742 |

*Primary Examiner*—Michael H. Lee
*Attorney, Agent, or Firm*—Gordon R. Lindeen, III; Georgann S. Grunebach; Wanda Denson-Low

[57] ABSTRACT

A system and technique for directing intensity modulated electromagnetic energy. The inventive system (10) includes an intensity modulated source of electromagnetic energy (12). Individual elements (22) in an array of energy directing elements (15) are activated in sync with the modulation of the energy source (12). In a particular implementation, the source (12) is a laser. The intensity of the laser is reduced during each successive field per frame. The energy directing elements (15), in this case, light directing elements, are implemented with an array of digital micromirrors. The light source (12) is modulated in intensity in accordance with a fixed modulation scheme. The mirrors (22) are selectively activated relative to the light source modulation scheme. Hence, the invention provides a gray scale output while allowing the time between mirror flips to be constant. This allows the system clocks to run synchronously and greatly simplifies the writing of data into the display as the time available for writing each bit is constant.

15 Claims, 8 Drawing Sheets

FULL COLOR SEQUENTIAL IMAGE PROJECTION SYSTEM INCORPORATING PULSE RATE MODULATED ILLUMINATION

This is a continuation-in-part of prior application for METHOD FOR ACHIEVING GRAY SCALE ON A BILEVEL DISPLAY USING VARIABLE ILLUMINATION, by M. N. Ernstoff, et al., Ser. No. 08/360,870, filed Dec. 21, 1994.

BACKGROUND OF THE INVENTION

1. Field of the Invention

The present invention relates to image projection systems. More specifically, the present invention relates to systems for projecting electronically described dynamic imagery on a large screen.

2. Description of the Related Art

Many applications require electronically described images to be projected on large screens, with high brightness, high resolution, and full color. Several technologies utilized for this purpose are currently known in the art including: 1) cathode-ray tubes, 2) active matrix liquid crystal light valves, 3) photo-activated liquid crystal light values and 4) light valves that work by deflecting portions of the light falling onto them, such as the Digital Micromirror Device®.

Cathode ray tube devices are best known and most prevalent. These devices are used for numerous applications including television displays and computer monitors. A cathode ray tube can be described as consisting of an electron gun to produce a beam of electrons, focus and deflection circuitry to paint the electrons onto a series of points on its faceplate, and a phosphorescent faceplate screen. The impact of the electrons onto the molecules of the phosphor in the screen generates photons. An image is formed by electronically controlling how many electrons land at each point on the screen over a given period of time.

For those color applications where the screen can be viewed directly, three electron guns are generally packaged within one cathode ray tube in a manner such that the electrons from each gun impact only the phosphor of the color associated with its contribution to the image, red, green or blue. For those applications requiring large luminous flux to achieve high brightness on a large screen, three cathode-ray tubes are generally used so as to maximize the available brightness. Unfortunately, there is still a limit to the maximum brightness attainable as the intensity of the electron beams cannot be increased past the point where the phosphor screens are damaged.

Light valve projectors use a spatial light modulator to impart spatial and temporal modulation to light from a high intensity source. In a liquid-crystal light valve, the electrical voltage applied across the liquid crystal material is generally used to modulate the polarization of the optical wavefront from the light source, and by subsequently passing the modulated light through another polarizer, often called an analyzer, one can obtain a light beam whose intensity is related to the applied electrical voltage. In other light valves, tilting mirrors or other mechanical means are used to control whether or not the light from the lamp passes through an aperture stop and onto the screen.

In liquid crystal light valves, the electrical voltage applied across a thin film of liquid crystal material is modulated spatially and temporally so as change the optical properties of the liquid crystal material as a function of its location at any given instant in time. In an active-matrix liquid-crystal light value, the most prevalent type of liquid-crystal display at the present time, row and column electrodes are used to channel the electrical signals to the appropriate location at the desired point in time. In a photo-activated light valve (sometimes known as an Image Light Amplifier), a device expressly designed for projection applications, the image on the phosphor screen of a CRT is reimaged onto a photoconductor which in turn controls the electrical voltage applied across the film of liquid crystal material. Unfortunately, liquid-crystal light valve projectors are complex to manufacture, and the analog nature of the light modulation process makes it difficult to achieve high spatial and temporal uniformity.

Several groups have proposed using a micromachined device built on a silicon integrated circuit as a light valve. One example of such a device is the Digital Micromirror Device® (DMD). In one embodiment the DMD consists of a complementary metal-oxide semiconductor (CMOS) static random access memory (RAM) chip with an array of mirrors mounted over the surface of the chip such that there is a one-to-one relationship between each memory cell and a mirror. Each mirror has a deformable mount such that it can be tilted to one of two stable positions depending on the data stored in the corresponding memory cell. In the "on" position, for example, a mirror is tilted to allow light incident on the array to pass through a tiny aperture for projection onto a screen. In the "off" position, the mirror is not tilted, and incident light is reflected away from the projection aperture. Hence, by programming the tilt of each mirror in the array of mirrors as a function of time, spatial and temporal modulation may be imparted to the otherwise uniform illumination from the light source. With a suitable lens, the light reflected by the array of mirrors may be focused onto a screen for viewing.

Like other devices of its class, the DMD is digital, with each cell being either "on" or "off". Thus, some system had to be developed to produce the gray scale required to create quality pictorial images. Gray scale image projection in these devices is effected currently by varying the amount of time that the mirror is tilted. In particular, the DMD currently uses a bit sequential method of displaying gray scale. The data for the most significant bit is displayed by tilting the mirror for ½ of the total frame time, the second most significant bit is displayed for ¼ the total frame time, and so on. Thus, for a system which uses an eight bit digital word to display video data at each pixel, if each bit is written immediately before it is displayed, the time available to write each bit nominally varies from ½ frame to $1/256$ [or $1/(2^{8})$] of a frame, assuming 8-bit video which gives you seven steps in addition to fully "on" and "off."

In a recent article by Claud Tew et al. entitled "Electronic Control of a Digital Micromirror Device® for Projection Displays," published in the 1994 IEEE International Solid-State Circuits Conference, pp. 130–131, at least two different designs are described for Digital Micromirror Devices®. However, both of these involve pulse-width modulation implemented by rapidly flipping the mirrors back and forth to achieve gray scale images, images that appear to have regions whose brightness is between black and white. Image brightness is controlled by the period of time during which the mirror for a given unit cell or pixel is in the "on" position. In an eight bit system implementation, the shortest field period required is nominally $1/256$ times as long as the frame period. During this time the system must be able to write the data for the next bit field (otherwise the DMD will not be ready to change state when required). With a typical frame rate of 1/60th of a second (consistent with US TV standards), the dimmest bit can be on for no more than 1/256 times 1/60th of a second. This presents speed problems which are exacerbated in larger arrays where perhaps 1080 lines of 1920 pixels (a proposed HDTV standard) must be addressed during each field. Color can be presented by using three DMDs, one for each primary color, or by using one device presenting the three colors sequentially. The later approach is less costly and thus more desirable, but it further exacerbates the speed problem by requiring everything to run three times faster.

Thus, there is a need in the art for an inexpensive system and technique for displaying electronically described images, possibly with high brightness (e.g. 5000 lumens), on a large screen. In particular, there is a need in the art for an inexpensive system and technique for displaying electronic images of varying intensity in color.

SUMMARY OF THE INVENTION

The need in the art is addressed by the present invention which, in a most general sense, provides a system and technique for directing intensity modulated electromagnetic energy. The invention includes an intensity modulated source of electromagnetic energy. Individual elements in an array of energy directing elements are activated in sync with the modulation of the energy source.

In a particular implementation, the source is a laser. The intensity of the laser is reduced during each successive field per frame. The energy directing elements, in this case—light directing elements, are implemented with an array of digital micromirrors. The light source is modulated in intensity in accordance with a fixed modulation scheme. The mirrors are selectively activated relative to the light source modulation scheme. The invention provides a gray scale output while allowing the time between mirror flips to be constant. This allows the system clocks to run synchronously and greatly simplifies the writing of data into the display as the time available for writing each bit is constant. The display of the present invention obviates the need for one of the buffer memories required at each pixel location by the systems of the related art, as there is no need to write multiple bits into a particular pixel.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
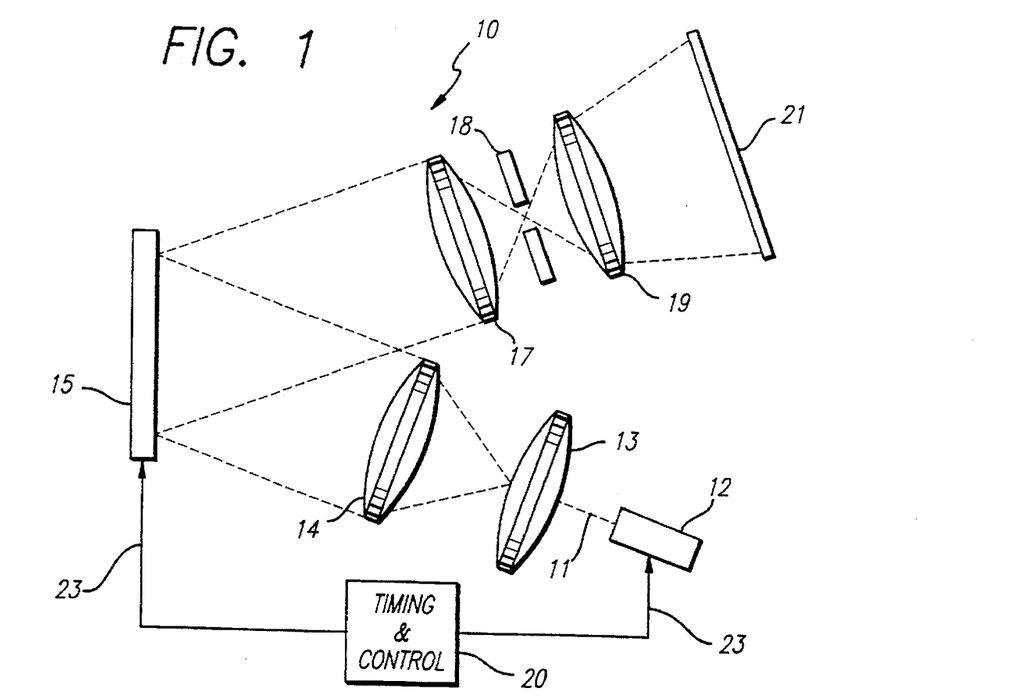
FIG. 1 is a diagram of illustrative embodiment of the image projection system of the present invention.

FIG. 1 is a diagram of an illustrative embodiment of the image projection system of the present invention. The system 10 includes a light source 12. The light source 12 should be one that can uniformly illuminate the array 15 of spatial light modulators and whose output light 11 can be modulated in intensity in a known and predictable manner. Hence, while in the illustrative embodiment, the light source 12 is implemented with a laser, the light source may be implemented with any other source which may be intensity modulated fast enough to perform gray scale encoding at video frame rates. The output of the laser light 11 is expanded by lenses 13 and 14 (or an alternative optical configuration) so as to fully and uniformly illuminate the spatial light modulator 15. In the preferred embodiment, the spatial light modulator 15 is a Digital Micromirror Device® (DMD) or other digital light modulator such as was described in the discussion of related art above. Although the following discussion assumes a DMD light valve, any light modulating device that generates gray scale by deflecting light into different directions such that it either passes through an aperture or does not pass through the aperture could be used.

As described in the above-referenced article entitled, "Electronic Control of a Digital Micromirror Device® for Projection Displays," published in the 1994 edition of the IEEE International Solid-State Circuits Conference, p. 130–131, by Claude Tew et al., Digital Micromirror Devices® include a plurality of miniature mirrors suspended above the substrate of an integrated circuit chip. The tilt angle of each mirror may be controlled by an electronic signal 23.

Figure 2:
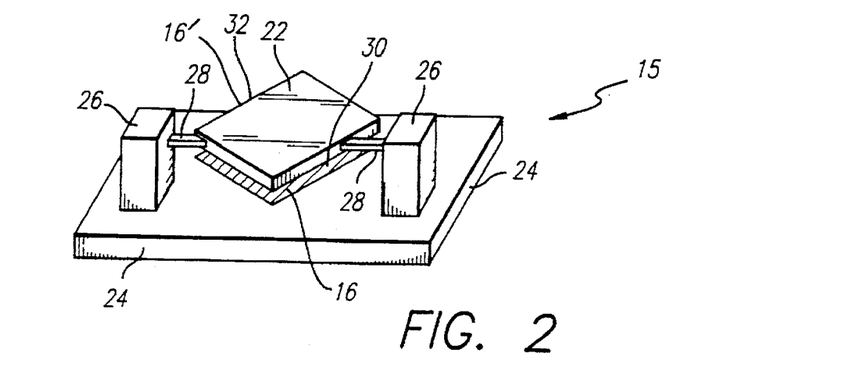
FIG. 2 is a schematic view of a single pixel from a DMD chip.

FIG. 2 is a schematic view of a single pixel from a DMD chip. As illustrated in FIG. 2., the DMD 15 includes a mirror element 22 which is suspended above a substrate 24. In the illustrated embodiment, each mirror element 22 is supported by two torsion hinges 28 and posts 26. Two electrodes 30 and 32 supply the electromotive forces to rotate the mirror 22 about the axis of the torsion hinges. To tilt the mirror 22 to a desired position, true and complementary data 16, 16' are supplied to the two electrodes 30 and 32. The resultant electrostatic force tips the mirror toward the desired position.

Figure 3A:
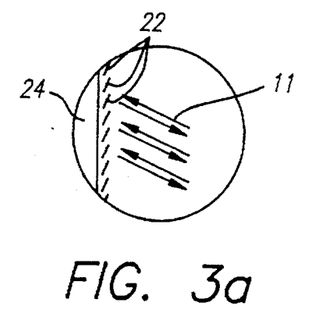
FIG. 3a shows the DMD mirror elements in an 'off' state.
Figure 3B:
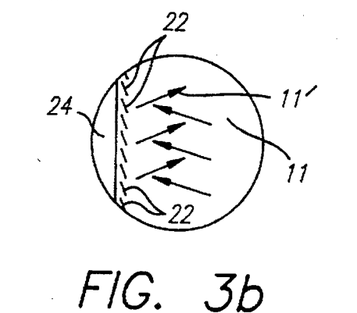
FIG. 3b shows the DMD mirror elements in an 'on' state.

FIGS. 3a and 3b are magnified cross-sectional schematic views of a section of the DMD 16. FIG. 3a shows the DMD mirror elements in an "off" state. FIG. 3b shows the DMD mirror elements in an "on" state. As shown in FIG. 3a, when the DMD elements are in an "off" state, the light energy is reflected back to the source 12. When the mirror elements are in an "on" state, as illustrated in FIG. 3b, the light is reflected at an angle such that the light is collected by the lens 17 of FIG. 1 and passes through an aperture or Schlieren stop 18 to be projected by the lens 19 onto the screen. Typically, the DMD picture element mirrors rotate from +10° to −10°. The optical characteristics of lenses 17 and 19 are selected to reimage the DMD mirror elements onto the screen 21. The role of the Schlieren stop in this application is analogous to the analyzer in a liquid crystal light valve; it converts the change in light direction into a change in light intensity.

As shown in FIG. 1, a timing and control circuit 20 specifies and coordinates the changes in the intensity of the light source 12 in synchronism with the data input signals to the DMD as discussed more fully below. The timing and control circuits effect the selective activation of the DMD elements as necessary to provide the desired gray scale intensity for each pixel on the screen 21.

Figure 4:
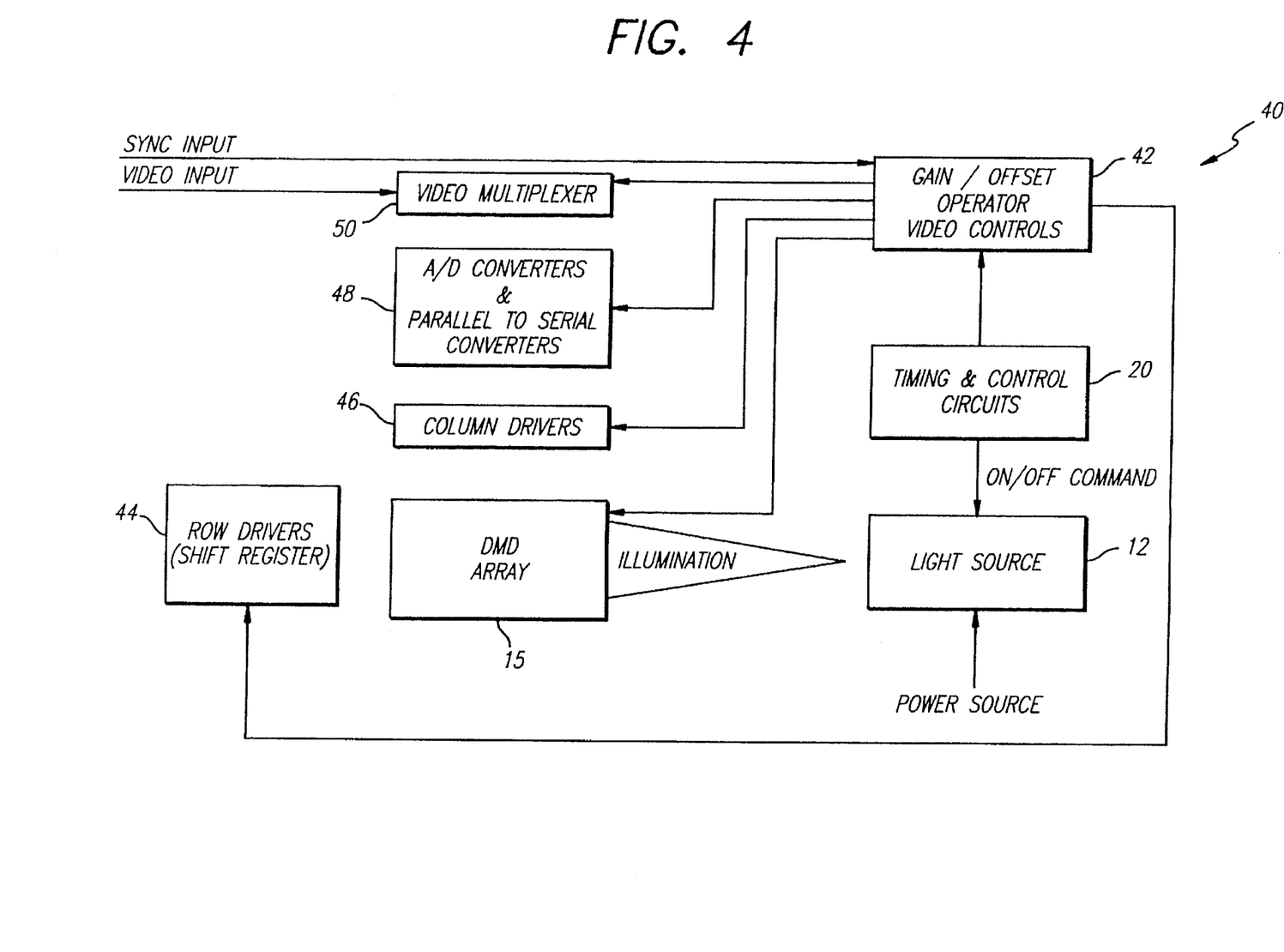
FIG. 4 is a block diagram of the electrical circuit of the image projection system of the present invention.

FIG. 4 is a block diagram of the electrical circuit 40 of the image projection system of the present invention. The illustrated embodiment provides for an analog video signal to be de-multiplexed by a video multiplexer 50 into numerous analog to digital (A/D) converters 48, e.g., one for each column of the DMD. A video gain and offset control circuit 42 provides contrast and brightness adjustment capability. (If the video is available in digital format, the de-multiplexing could be performed digitally and the A/D converters could be eliminated.) A frame of digital video information is then stored in an array of serial to parallel converters 48 until it is needed to drive the DMD. Column drivers 46 are provided to insure adequate capacity is available to drive the electrical load represented by the DMD 15. The row drivers 44 provide signals for sequential loading of each field of data into the DMD 15. The modulated light source 12 as well as each of the other blocks, is controlled by the timing and control circuits 20.

The illustrated embodiment provides for an array of parallel to serial converters to store of an entire frame of video data 48. The parallel to serial converters enable the most significant bit of each video word to be used to control the first field in the frame; the next most significant bit of each video word to be used to control the second field in the frame, and etc. The timing and control circuit 20, parallel to serial converters 48, gain and offset circuits 42, and column drivers 46, may be implemented with microprocessors, gate arrays or with discrete digital or analog circuits in a conventional manner. The functions may be partitioned so that some can be fabricated as part of the DMD.

The basic memory element controlling each mirror on the DMD can be assumed to be a simple flip-flop logic element (not shown). Each flip-flop has an input which determines the state it will assume after the second of two clock transitions; one clock transition loads in the new data and the next (opposite) clock transition changes the state of the flip-flop to correspond to the new data. Each mirror in the DMD array tilts in a manner corresponding to the state of its associate flip-flop.

The row driver 44 successively and sequentially places a row enable signal on each of the row electrode buses of the DMD array. All of the flip-flops (not shown) in any row of mirror elements (pixels) are loaded simultaneously with "on" or "off" instructions depending on the state of their corresponding column driver. By updating the data presented on each column electrode bus in synchronism with the row enable signal stepping down the rows of the DMD, new data can be loaded into the flip-flop associate with each picture element (pixel) a row at a time. By simultaneously transitioning all of the row enable buses in the opposite manner, all of the loaded data is transferred into all of the flip-flop memories on a one-to-one basis, and an electronic representation of a binary (black or white) image field is translated into a programmed pattern of mirror positions and corresponding bright and dark pixels. The process is repeated, one field for each video bit, until all the fields in the frame have been presented. The process is repeated each frame, but with the variation required to create the illusion of moving images.

Figure 5A:
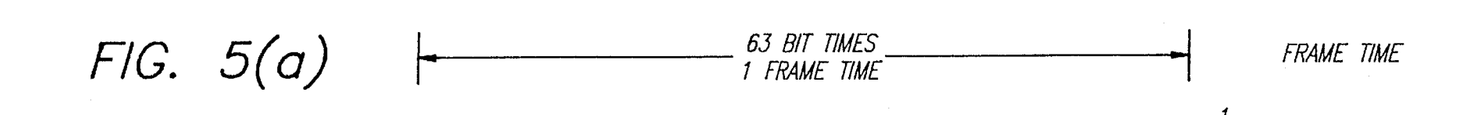
FIGS. 5(a)–(f) are timing diagrams of a typical conventional DMD based image projection system.
Figures 5B, 5C:
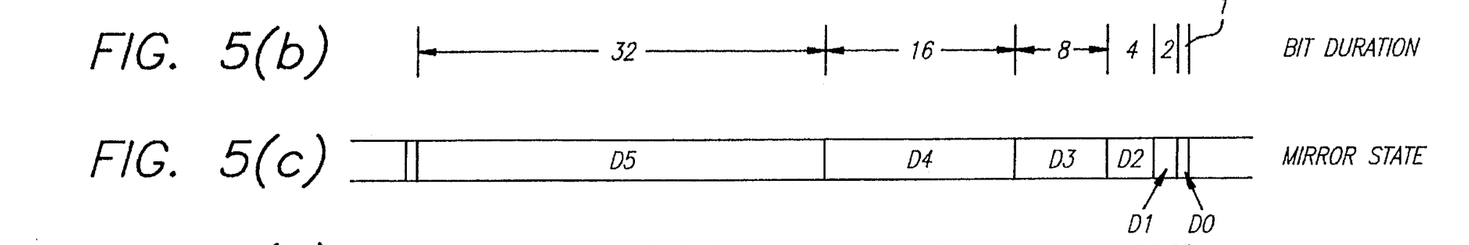
Figure 5D:
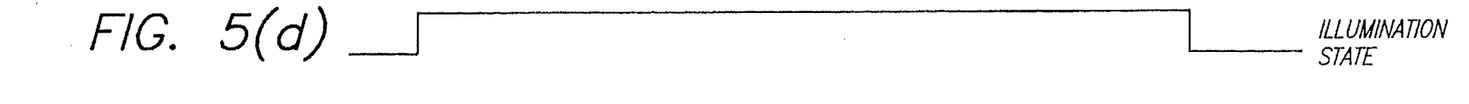
Figure 5E:
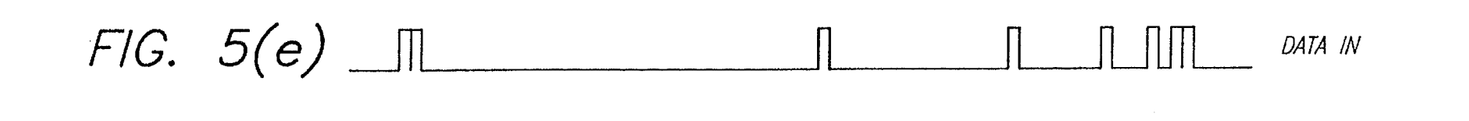
Figure 5F:
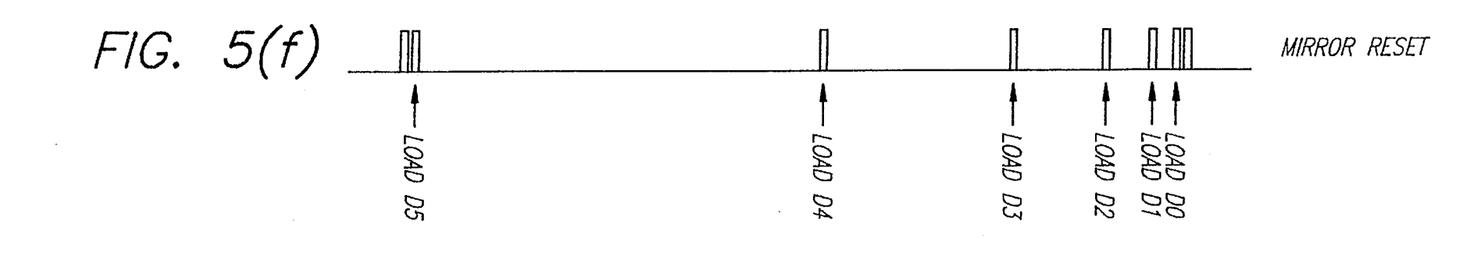
Figure 6A:
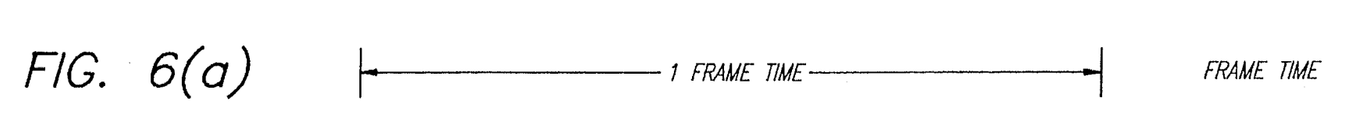
FIGS. 6(a)–(f) are timing diagrams of a display constructed and operated in accordance with the teachings of the present invention.
Figure 6B:
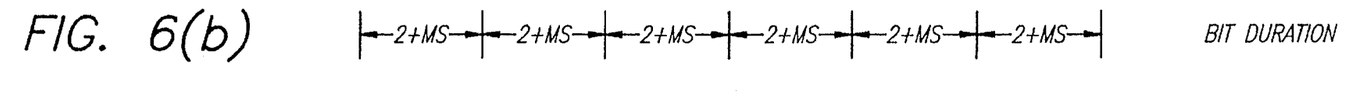
Figure 6C:
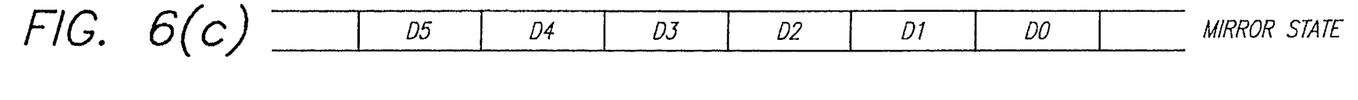

The advantages of the invention are apparent when the timing diagrams of FIGS. 5(a)–(f) and 6(a)–(f) are compared. FIGS. 5(a)–(f) and FIG. 7 are timing diagrams of a typical conventional DMD based image projection system. FIGS. 6(a)–(f) and FIG. 8 are timing diagrams of a display constructed and operated in accordance with the teachings of the present invention. Each shows the time line of a single frame, consisting of several fields. FIGS. 5(b) and 6(b) indicate quantitatively the time duration of each field. FIGS. 5 (c) and 6 (c) indicate the points in time in which the mirror can transition from one state to another. The FIGS. 5(d) and 6(d) indicate the state of the illumination modulation. The FIG. 5(e) and 6(e) indicate the time available to load the new data into the DMD array, and the FIG. 5(f) and 6(f) indicate the point at which the new data is transferred into the individual pixel flip-flops.

In the conventional DMD image projection system, the illumination is constant, and the load times and mirror state duration are dictated by the need to accommodate the shortest field duration. FIG. 5(a)–(f) shows such a system with six (zero through five) fields per frame; since the number of gray levels is (2 raised to the (number of fields—1)), this system would have fewer gray levels than a full 8-bit system. However, some DMD systems are limited to six bits by the conventional addressing method, since the seventh and eighth bits require even shorter writing times. FIG. 5 shows the time that is available to load in the new data for each field under the condition that it is set by the time available to load the data for the shortest field.

Figure 7:
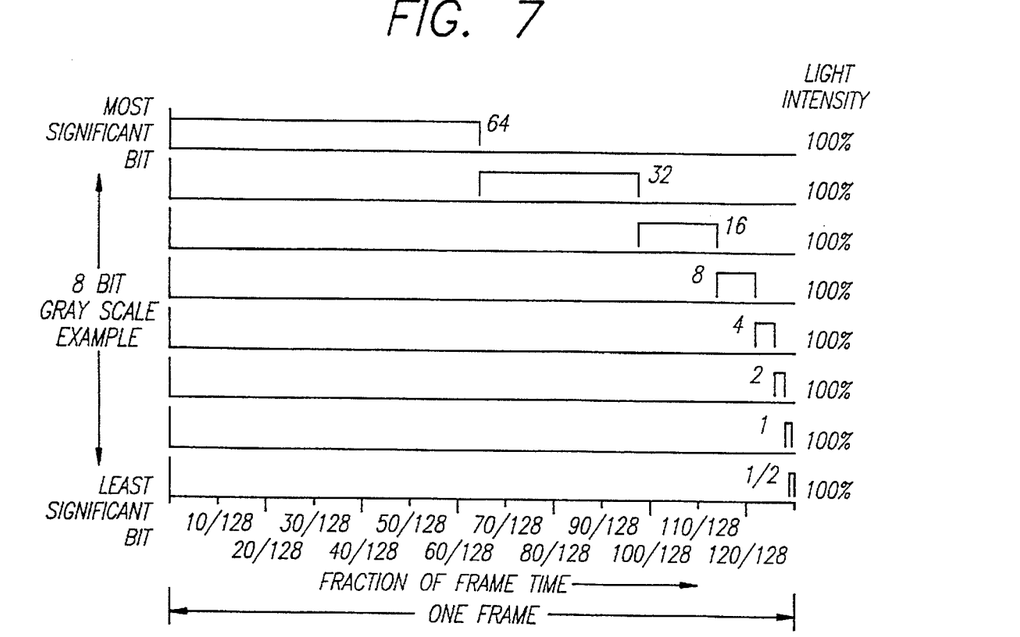
FIG. 7 shows mirror state as a fraction of flame time in accordance with conventional DMD mirror timing methodology.

FIG. 7 indicates the time that is available to load in the new data for each field and suggests that the data rate could possibly be reduced by spreading the data load time over more than just one field. To the first approximation, providing additional memory at each picture element location so another field can be stored within the array would halve the data rate but double the complexity of the device, an undesirable trade-off This invention teaches a method for reducing the data rate without increasing the array circuit complexity. In addition, the method described herein has the added advantage that it easily accommodates 8-bit video systems. In should be noted that in a conventionally illuminated DMD, the data rates are driven by the time available to load in the data for the shortest field, unless the data for multiple fields is stored within the array of the DMD, thus greatly increasing the complexity of the DMD.

In a conventional DMD image projection system, when eight bit video data is to be presented, the shortest field is $1/256 \times 1/60$ second. Furthermore, if the monochrome image is to have 1000 line resolution, the row enable pulse must be shorter than $1/256 \times 1/60 \times 1/1000$, or 65 nano-seconds. For the same image in field sequential color, the row enable pulse must be three times faster, a 45 Mhz clock rate with a nominal 22 nanosecond pulse length. To produce a pulse whose rise and fall time is short relative to its 22 nanosecond duration requires a circuit with bandwidth of ten times the inverse of the pulse width, or roughly 450 Mhz for this example. Implementing circuitry with such a capability over the large area and multitude of connections usually associated with a display device would undoubtedly unfavorably impact yield and costs.

Figure 6D:
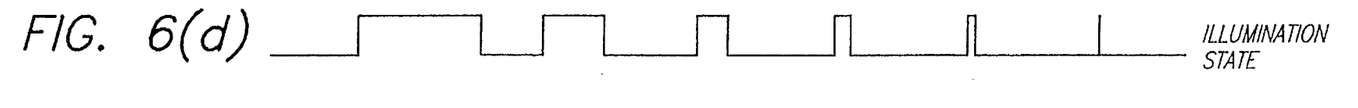
Figure 10A:
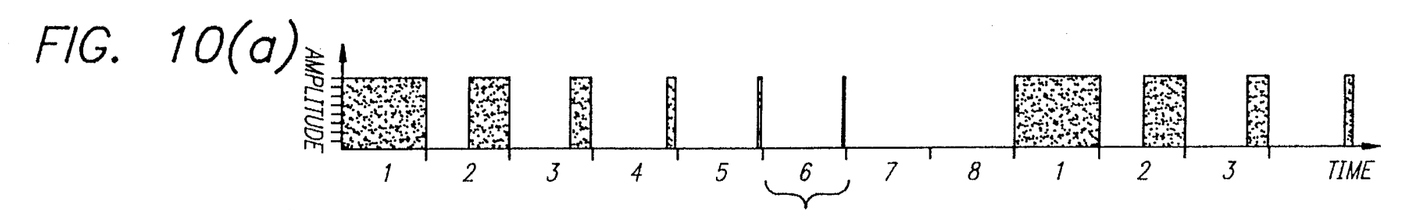
FIGS. 10(a)–(d) are timing diagrams of alternate intensity modulation schemes in accordance with the teachings of the present invention.

Reference is now made to FIGS. 6(a)–(f) and FIG. 8 which describe a frame interval as in FIGS. 5(a)–f and FIG. 7, but where the illumination is modulated, and the field periods are equally spaced. In accordance with the present teachings, the only parameter that varies is the light source "on" time, as shown by FIGS. 6(d) and 10(a), which is reduced by one-half for each successive field in any one frame. In accordance with the present teachings, the duration of the light pulse during the first field, shown in FIG. 6(d), is the full field period; the duration during the second field, shown in FIG. 6(d) is half of the field period; and the duration is half again in each subsequent field until the beginning of the next frame when the process starts all over again. If the pixel is to present maximum brightness, it is on for all fields. If the pixel is to present the minimum non-zero brightness, the pixel is "on" only during the field in which the light source pulse is of minimum pulse width. If the pixel is to present a 50% gray shade, it on for the one field period when the light source is also on for the full period. All other gray scale levels can be achieved by suitable combinations of light pulse durations.

Note that to simplify this illustration, the sum of series: ½, ¼, ⅛, ⅟₁₆, ⅟₃₂, ⅟₆₄, ⅟₁₂₈, ⅟₂₅₆ was assumed to be 1, or unity, but in fact it is actually 0.9960938. Thus, the brightness of a pixel that is on for all eight fields, in a eight field frame, is actually 255 times the brightness of the minimum non-zero value. The durations of the light pulses can be trimmed slightly should it be necessary for the brightness levels to have precise binary time duration relationships.

Figure 6E:
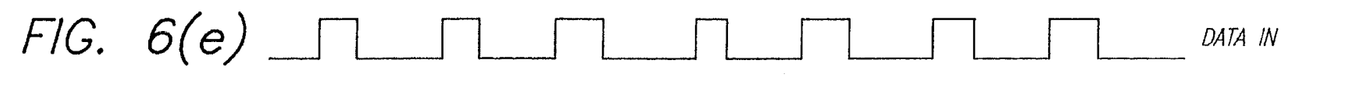
Figure 6F:
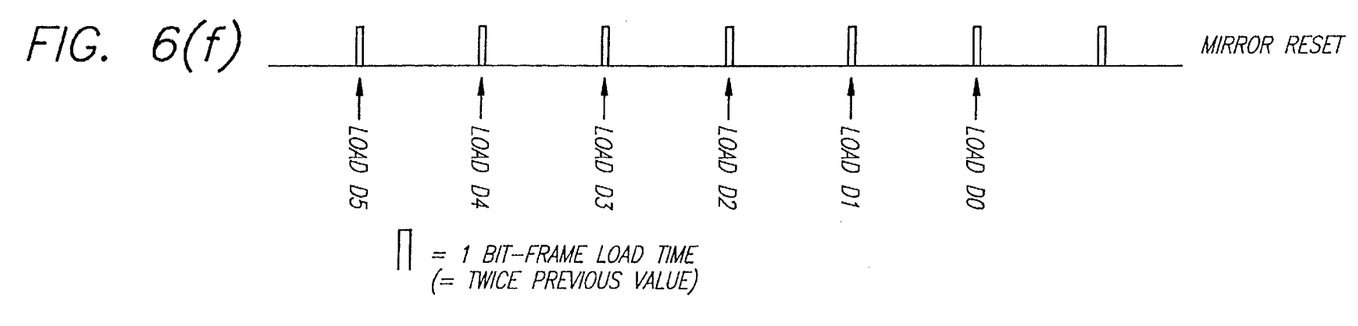
Figure 8:
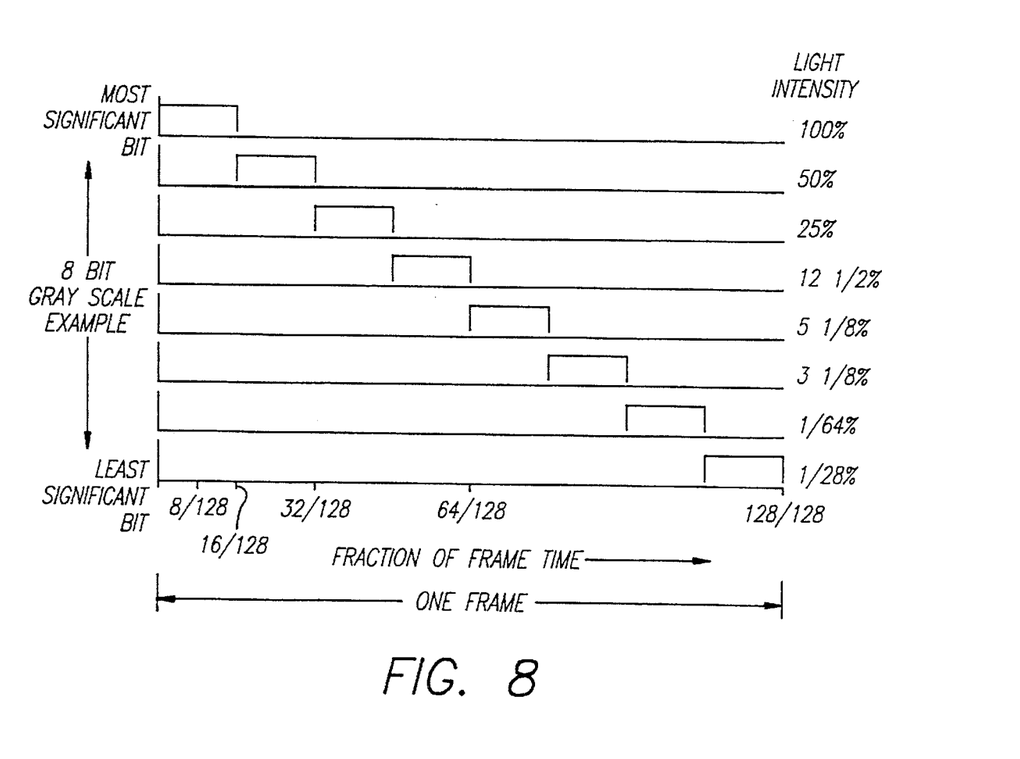
FIG. 8 depicts mirror state as a fraction of frame time in accordance with teachings of the present invention.

As illustrated in FIG. 8, the time available to load new data is constant and equal to 1/N of the frame period, where "N" is the number of bits used for gray shade definition. In a system where eight bits are used for gray shade definition, the time available to load new field data is 16 times longer with the approach illustrated in FIG. 8 than the approach illustrated in FIG. 7. As a result, in actual practice it may not be necessary to use the entire field period to load the new data as illustrated in FIG. 6(e).

Figure 9:
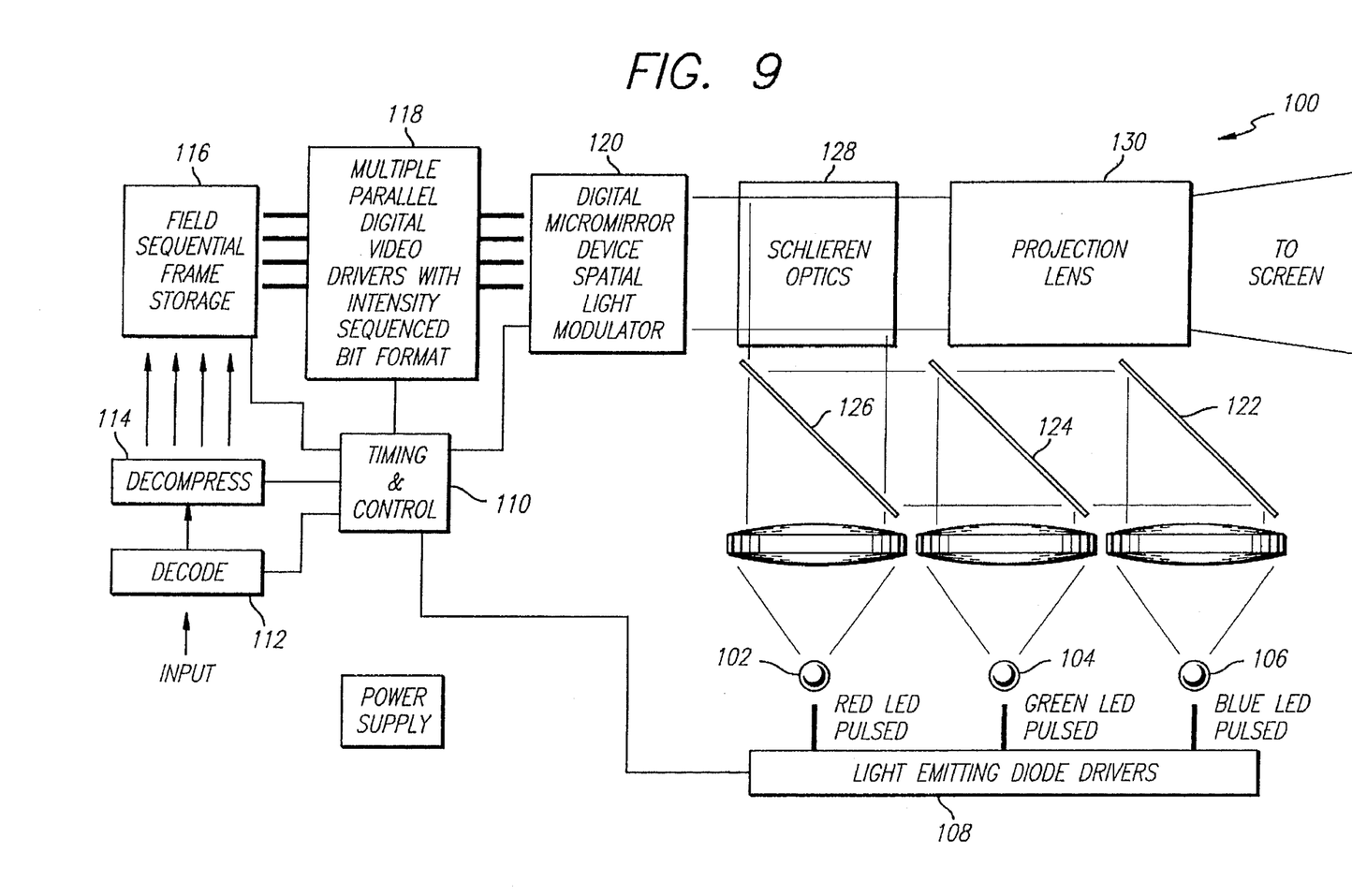
FIG. 9 is a simplified block diagram of an illustrative implementation of a field sequential color display system utilizing the teachings of the present invention.

FIG. 9 is a simplified block diagram of an illustrative implementation of a field sequential color display system utilizing the teaching of the present invention. As shown in FIG. 9, the system 100 includes first, second and third light sources 102, 104, and 106. Either light-emitting diodes (LEDs) or lasers may be used.

In a LED-based system, the first (red) light source 102 may be implemented with a commercial 5 mW light emitting diode (LED). The second (green) light source 104 may be implemented with a 1 milliwatt ZnSe/ZnTeSe LED in accordance with the teaching of D. B. Eason et al., in Electronics Letters 30, 1178 (1994). The third (blue) light source may be implemented with a 2 mW InCaN/AlCaN LED, as described by S. Nakamura et al., Applied Physics Letters 64, p. 1687 (1994).

In the alternative using lasers, green light at 532 nm may be obtained from a diode pumped 1.06 micron Nd:YAG laser that is doubled into the green by a KTP crystal, as described by L. R. Marshall et al. in Optics Letters 17, p. 1110 (1992). Blue light can be obtained by frequency-doubling either a diode pumped Nd:Yag laser at 946 nm or an InGaAs laser at 940 nm with a $KNbO_3$ crystal (E. Peik & H. Walther, Optics Letters 19, p. 192 (1994) or L. Goldberg et al., Electronics Letters 30, p. 1296 (1994)). Red light at 633 nm can be obtained from an AllnP/InGaP diode laser (R. S. Geels et al., Electronics Letters 28, p. 1043 (1992) or H. Hamada et al., Electronics Letters 27, p. 662 (1991)). In particular watts of light can be obtained currently from these lasers, corresponding to over 2000 lumens total in a color system.

Light sources (such as lasers) should be used that can be modulated fast enough such that their transition times are short compared to the narrowest illumination pulse, approximately 22 micro-seconds for a 60 Hz, 8-bit field-sequential color system. The semiconductor light-emitting diodes (LEDs) in the first description above can be modulated up to the RC time constant, which for typically sized devices is above 100 MHz. The semiconductor light emitting diodes (LEDs) in the second description above includes a diode laser for the red with a similar upper limit. The green and blue laser sources involve frequency doubling in crystals or cavities. Methods to obtain fast modulation in such cavities have been discussed by W. J. Kozlovsky and W. Lenth (Optics Letters Vol. 19, p.195, 1994), by T. Senoh et al. (Appl. Phys. Lett. vol. 19, p.1172, 1992) and by L. Goldberg and D. Mehuys (Electronics Letters, vol. 30, p. 1296, 1994).

Figure 10B:
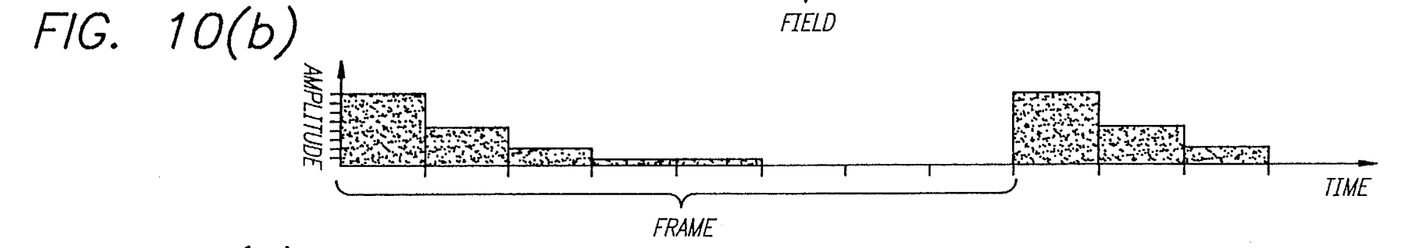

An alterative to turning the light sources "on" and "off" for periods corresponding to the different bits is to vary the intensity of the light, as shown in FIG. 10(b). Thus by making the light ½ as bright for the second bit, ¼ as bright for the third bit, etc., the benefits of this invention can also be obtained.

Figure 11:
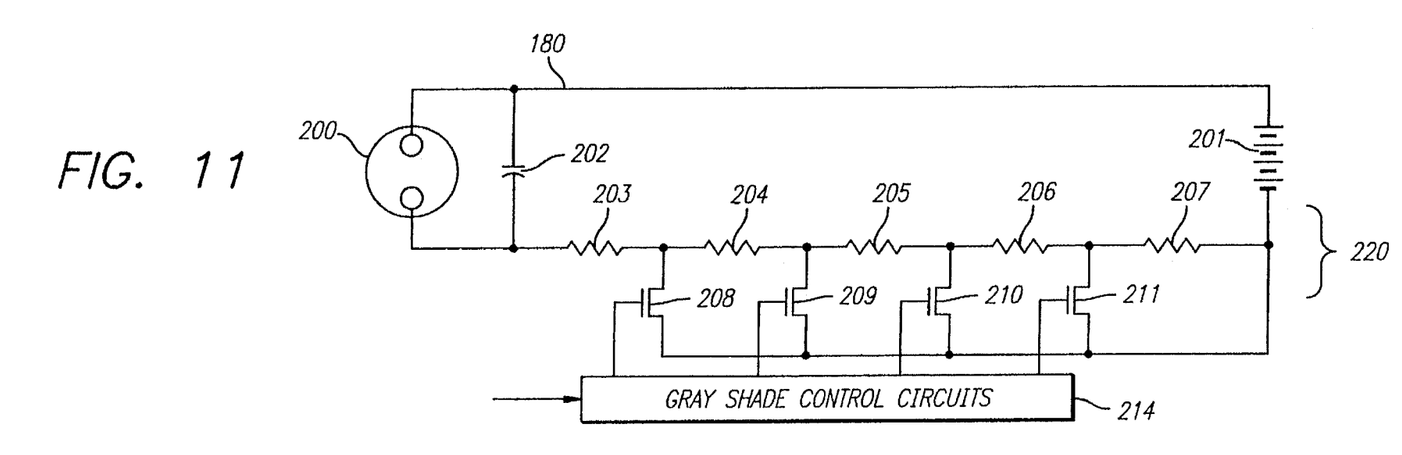
FIG. 11 is a diagram of a circuit for providing a variable rate pulsating light source in accordance with the teachings of the present invention.
Figure 12:
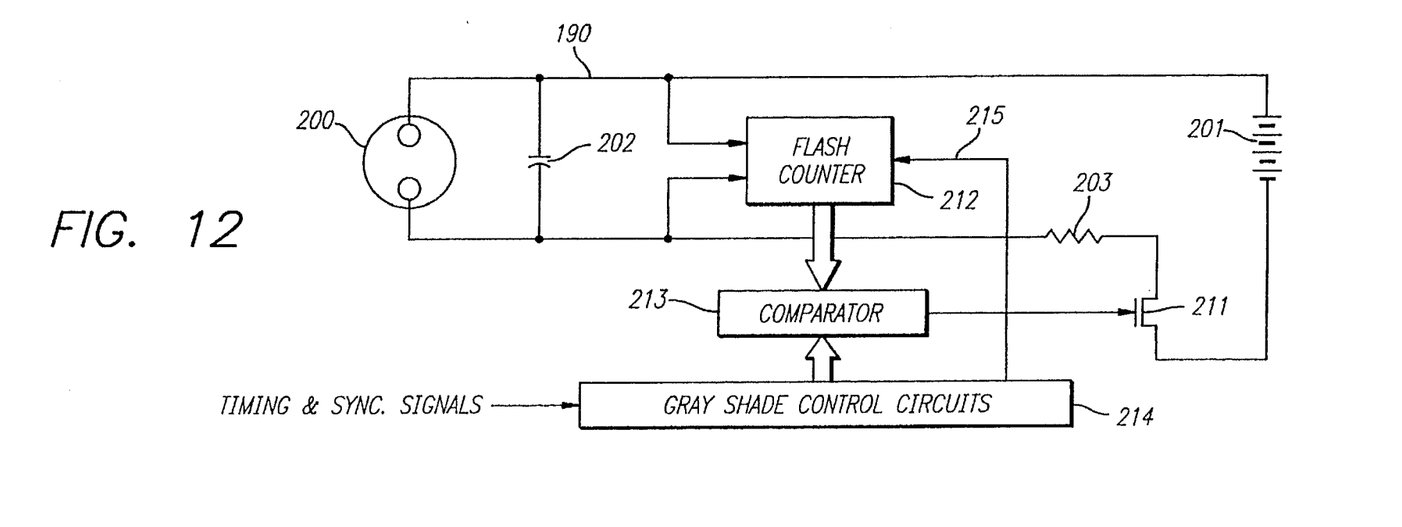
FIG. 12 is a diagram of a circuit for providing a variable count pulsating light source in accordance with the teachings of the present invention.

Another method of varying the intensity of the illumination involves the use of a pulsating light source in which the pulse rate or the pulse count can be varied from field to field across the multiple fields required to obtain gray scale. FIG. 11 is a diagram of a circuit for providing a variable rate pulsating light source in accordance with the teachings of the present invention. FIG. 12 is a diagram of a circuit for providing a variable count pulsating light source in accordance with the teachings of the present invention. In this method, the control of lamp brightness is digital, with the average brightness determined by the number of pulses. The benefits of the invention can be obtained without fields of precisely the same length, eight fields per frame, the average intensity decreasing monotonically by 50% with each successive field, or a non-zero value for the field associated with the least significant bit. However, the control circuitry is simplified for fields of equal duration and monotonic decreases in average intensity. Further, decreasing the average density per field in square-root-of-two steps simplifies the brightness encoding by reducing banding when only a few bits are used to describe the gray scale.

Figure 10C:
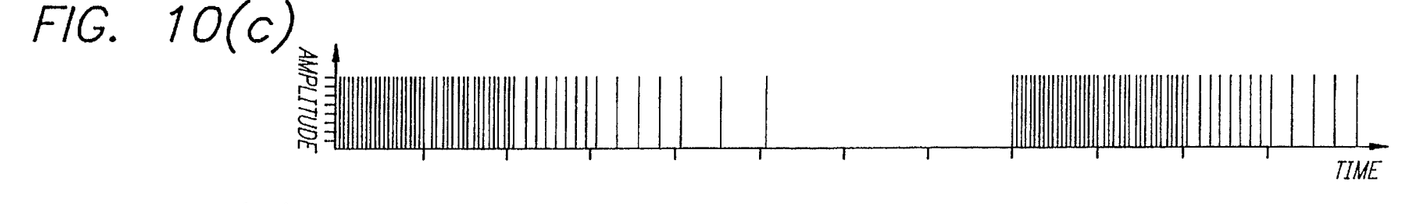

FIG. 11 depicts a relaxation oscillator circuit 180 for providing a pulsating light source of varying rate. The Gray Shade Control Circuits 214 receive timing and synchronization Signals indicating the start of each frame and the start of each field from the timing and control circuit 110 (not shown). The flash lamp 200 is of a type which ignites and emits light whenever its terminal voltage rises above its ignition point, and ceases to be lit when its terminal voltage drops below the sustaining point. The voltage on the storage capacitor 202 increases with time as it is charged by the voltage source 201 through the series resistor 220. When the voltage on the capacitor 202 exceeds the ignition point of lamp 200, the lamp 200 ignites and the capacitor 202 begins to discharge through the lamp. When the voltage on the capacitor 202 is no longer sufficient to sustain the arc, the lamp 200 extinguishes, and the cycle repeats. The rate at which the lamp 200 flashes depends upon the magnitude of the voltage source 201, the size of the capacitor 202, and the resistance of the series resistor 220. The flash rate of lamp 200 can be set at any one of four rates by controlling the magnitude of the series resistor 220 through the use of the resistors 203, 204, 205, 206, and 207 and the field effect transistors (FETs) 208, 209, 210, and 211. The magnitude of the series resistor 220 is the sum of the resistance of the resistors 203, 204, 205, 206, and 207 that have not been shunted by the FETs 208, 209, 210, and 211. For instance, when only FET 210 is "on," the resistance of the parallel combination of FET 210 and resistor 206 is small compared to the series resistance of the unshunted resistors 203, 204, 205, and 207. The Gray Shade Control Circuits 214 achieve the required flash rate by turning the appropriate FETs "on" and "off." Additional and finer steps can be obtained by adding additional resistors and FETs. For example, the monotonically decreasing flash rate shown in FIG. 10(c) can be obtained by employing seven parallel resistor-FET circuits in circuit 180 in which each resistor has twice the resistance of the adjacent upstream resistor and the series resistance of each FET is negligible when it is "on." In the first field of the frame, the preprogrammed Gray Shade Control Circuits 214 turn "on" all of the FETs. In the second frame, one FET is turned "off," in the third frame, two FETs are turned "off," and the process continues until all seven FETs have been turned "off" in an eight field frame. A three-terminal flash lamp in which a separate igniter element triggers the flash, such as those commonly used in flash photography, could be substituted for the analog timing circuit shown to facilitate precision control of lamp flash rate and flash synchronization. FIG. 10(c) depicts pulse rate modulation of the illumination in accordance with the present invention.

Figure 10D:
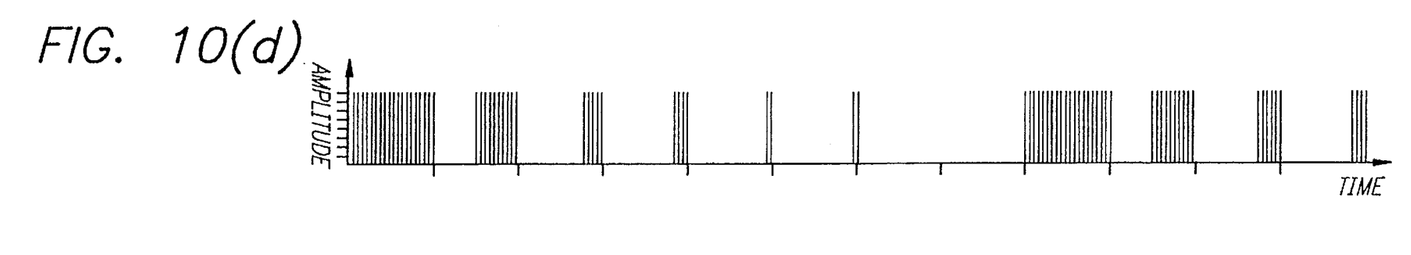

FIG. 12 illustrates a circuit 190 for controlling the total number of light pulses per field. The simple relaxation oscillator circuit 190, including the lamp 200, the capacitor 202, resistor 203 and voltage source 201, may be used to cause the lamp 200 to flash repetitively when the FET 211 is "on." When the number of flashes in a field counted by the counter 212 equals the allowed number of flashes established by the Gray Shade Control Circuits 214 for that field, the comparator 213 generates a signal that turns off the Flit 211 and thereby extinguishes power to the lamp 200. At the start of the next field, the counter 212 is reset by reset signal 215, and the Gray Shade Control Circuits 214 present an updated number to the comparator 213. Because the comparison sensed by the comparator 213 is no longer equal, the FET 211 is turned back "on," and the process is repeated. At the end of each frame, the cycle repeats. To obtain the monotonically decreasing flash count shown in FIG. 10(d), at the start of the first frame, the Gray Shade Control Circuits 214 provide to the comparator 213 the number of pulses desired for the first field of the frame. For each subsequent field of the frame, the Gray Shade Control Circuits 214 provide to the comparator 213 a number corresponding to half of the number provided to the comparator 213 for the previous field. The process continues through the end of the frame and repeats at the start of the next frame. FIG. 10(d) depicts pulse count modulation of the illumination.

Returning to FIG. 9, each of the light sources is driven by an LED driver circuit 108 with timing signals provided by a timing and control circuit 110. The timing and control circuit 110 also provides timing and control signals to an optional encryption decoder circuit (112), an optional image decompression circuit 114, a field sequential frame storage circuit 116, digital video drivers 118 and an image generator such as a DMD 120. The digital video drivers 118 may be implemented as in FIG. 4 with multiple row drivers 44, column drivers 46, parallel to serial converters 48 and video multiplexers 50, so as to provide the requisite sequenced bit format.

The output of the third (blue) light source 106 is reflected by an optional fold mirror 122 through a first dichroic beam combiner 124 to a second dichroic beam combiner 126 where it is reflected into the Schlieren Optics 128. The Schlieren Optics may be implemented as in FIG. 1 with a lens 14 for collimating the illumination and a lens 17 for focusing the reflected light into an aperture 18. Similarly, the output of the second (green) light source 104 is reflected to the second dichroic mirror 126 by the first dichroic mirror 124. The second dichroic mirror reflects the light from the second source into the Schlieren Optics 128. Light from the first (red) light source 102 is transmitted through the second dichroic beam splitter directly to the Schlieren Optics 128.

The timing and control circuit 110 selectively activates each of the light sources 102, 104, and 106 while simultaneously coordinating and synchronizing the transfer of data into the DMD, so that a single DMD may provide gray scale and spatial modulation to the light sequentially provided by each of the three light sources. Light reflected from the DMD "on" pixels, as discussed herein, is passed by the Schlieren Optics to the projection lens 130 for reimaging on a screen (not shown) in the manner discussed above.

Thus, the present invention has been described herein with reference to a particular embodiment for a particular application. Those having ordinary skill in the art and access to the present teachings will recognize additional modifications applications and embodiments within the scope thereof. For example, the invention is not limited to the modulation of the mirrors with input data. In the alternative, or, in addition, the modulation of the light source may be responsive to input data.

It is therefore intended by the appended claims to cover any and all such applications, modifications and embodiments within the scope of the present invention. Accordingly,

What is claimed is:

1. A system for generating gray scale imagery comprising:
    a variable count pulsating source of electromagnetic energy;
    a spatial light modulator for directing energy from said variable count pulsating source, said spatial light modulator including an array of energy directing elements, said energy directing elements including micromirrors for facilitating the generation of gray scale imagery by selectively directing light from said source through an aperture; and
    a timing and control circuit to selectively activate said micromirrors in said array in said spatial light modulator while selectively modulating said source to produce said gray scale imagery.

2. An image projection system comprising:
    a variable count pulsating light source;
    a spatial light modulator for directing light from said variable count pulsating source, said spatial light modulator including an array of light directing elements, said light directing elements including micromirrors for facilitating the generation of gray scale imagery by selectively directing light from said source through an aperture;

timing and control means to selectively activate in coordination with said variable count pulsating light source said spatial light modulator in response to a first signal and to selectively activate said variable count pulsating light source in response to a second signal; and a display surface for displaying light directed by said spatial light modulator towards said display surface.

3. The invention of claim 1 wherein said first signal includes an input data signal.

4. The invention of claim 1 wherein said second signal includes an input data signal.

5. The invention of claim 1 including electronic means for providing said first and said second signals.

6. A system for directing electromagnetic energy comprising:

a variable count pulsating source of electromagnetic energy;

a spatial light modulator for directing light from said variable count pulsating source, said spatial light modulator including an array of energy directing elements, said energy directing elements including micromirrors for facilitating the generation of gray scale imagery by selectively directing light from said source through an aperture;

a timing and control circuit to selectively activate said spatial light modulator in response to a first signal and further operable to selectively activate said variable count pulsating source in response to a second signal; and electronic means for providing said first and said second signals, wherein said first signal and said second signal comprise n fields per frame.

7. A system for directing electromagnetic energy comprising:

a variable count pulsating source of electromagnetic energy;

a spatial light modulator for directing light from said variable count pulsating source, said spatial light modulator including an array of energy directing elements, said energy directing elements including micromirrors for facilitating the generation of gray scale imagery by selectively directing light from said source through an aperture;

a timing and control circuit to selectively activate said spatial light modulator in response to a first signal and further operable to selectively activate said variable count pulsating source in response to a second signal;

electronic means for providing said first and said second signals, wherein said first signal and said second signal comprise n fields per frame; and means for modulating the intensity of said source for each field.

8. A system for directing electromagnetic energy comprising:

a variable count pulsating source of electromagnetic energy;

a spatial light modulator for directing light from said variable count pulsating source, said spatial light modulator including an array of energy directing elements, said energy directing elements including micromirrors for facilitating the generation of gray scale imagery by selectively directing light from said source through an aperture;

a timing and control circuit to selectively activate said spatial light modulator in response to a first signal and further operable to selectively activate said variable count pulsating source in response to a second signal;

electronic means for providing said first and said second signals, wherein said first signal and said second signal comprise n fields per frame; and means for modulating the intensity of said source for each field wherein the modulating means includes means for varying the pulse width of the source in each field.

9. A system for directing electromagnetic energy comprising:

a variable count pulsating source of electromagnetic energy;

a spatial light modulator for directing light from said variable count pulsating source, said spatial light modulator including an array of energy directing elements, said energy directing elements including micromirrors for facilitating the generation of gray scale imagery by selectively directing light from said source through an aperture;

a timing and control circuit to selectively activate said spatial light modulator in response to a first signal and further operable to selectively activate said variable count pulsating source in response to a second signal;

electronic means for providing said first and said second signals, wherein said first signal and said second signal comprise n fields per frame; and means for modulating the intensity of said source for each field wherein the modulating means includes means for varying the pulse amplitude of the source in each field.

10. A system for directing electromagnetic energy comprising:

a variable count pulsating source of electromagnetic energy;

a spatial light modulator for directing light from said variable count pulsating source, said spatial light modulator including an array of energy directing elements, said energy directing elements including micromirrors for facilitating the generation of gray scale imagery by selectively directing light from said source through an aperture;

a timing and control circuit to selectively activate said spatial light modulator in response to a first signal and further operable to selectively activate said variable count pulsating source in response to a second signal;

electronic means for providing said first and said second signals, wherein said first signal and said second signal comprise n fields per frame; and means for modulating the intensity of said source for each field wherein the modulating means includes means for varying the pulse rate of the source in each field.

11. A system for directing electromagnetic energy comprising:

a variable count pulsating source of electromagnetic energy;

a spatial light modulator for directing light from said variable count pulsating source, said spatial light modulator including an array of energy directing elements, said energy directing elements including micromirrors for facilitating the generation of gray scale imagery by selectively directing light from said source through an aperture;

a timing and control circuit to selectively activate said spatial light modulator in response to a first signal and further operable to selectively activate said variable count pulsating source in response to a second signal;

electronic means for providing said first and said second signals, wherein said first signal and said second signal comprise n fields per frame; and means for modulating the intensity of said source for each field wherein the modulating means includes means for varying the pulse count of the source in each field.

12. The invention of claim 1 wherein said variable count pulsating source is a laser.

13. The invention of claim 1 wherein said variable count pulsating source is incandescent.

14. A full color sequential image projection system comprising:

first, second and third variable count pulsed light sources;

a spatial light modulator for sequentially directing light from said variable count pulsed light sources, said spatial light modulator including an array of light directing elements, said energy directing elements including micromirrors for facilitating the generation of gray scale imagery by selectively directing light from said source through an aperture;

a timing and control circuit to selectively activate said spatial light modulator in response to a first signal and selectively sequentially activate each of said variable count pulsed light sources in response to a second signal; and a projector for projecting light towards a surface directed by said spatial light modulator.

15. A method for directing energy including the steps of:

directing electromagnetic energy of varying intensity from a variable count pulsed source with an array of energy directing elements, said energy directing elements including micromirrors for facilitating the generation of gray scale imagery by selectively directing light from said source through an aperture, including the steps of:

selectively activating said variable count pulsed source in response to a first signal and selectively activating said micromirrors in response to a second signal.

* * * * *